(12) United States Patent
Filsfils et al.

(10) Patent No.: US 11,558,288 B2
(45) Date of Patent: Jan. 17, 2023

(54) SCALABLE AND PROGRAMMABLE MECHANISM FOR TARGETED IN-SITU OAM IMPLEMENTATION IN SEGMENT ROUTING NETWORKS

(71) Applicant: Cisco Technology, Inc., San Jose, CA (US)

(72) Inventors: Clarence Filsfils, Belgium (BE); Zafar Ali, Hicksville, NY (US); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 16/138,650

(22) Filed: Sep. 21, 2018

(65) Prior Publication Data

US 2020/0099611 A1    Mar. 26, 2020

(51) Int. Cl.
*H04L 12/725*    (2013.01)
*H04L 45/302*    (2022.01)
(Continued)

(52) U.S. Cl.
CPC ............ *H04L 45/302* (2013.01); *H04L 45/04* (2013.01); *H04L 45/127* (2013.01);
(Continued)

(58) Field of Classification Search
CPC ..... H04L 45/302; H04L 45/04; H04L 45/127; H04L 45/306; H04L 69/22; H04L 2212/00
See application file for complete search history.

(56) References Cited

U.S. PATENT DOCUMENTS 4,236,068 A    11/1980    Walton
5,642,303 A    6/1997    Small et al.
(Continued)

FOREIGN PATENT DOCUMENTS

WO    WO 2013/020126    2/2013
WO    WO 2014/098556    6/2014
(Continued)

OTHER PUBLICATIONS

"Cisco ASR 5x00 Mobility Management Entity Administration Guide," Version 15.0, Cisco Systems, Inc., Last updated Jun. 13, 2014, pp. 1-266.
(Continued)

*Primary Examiner* — Parth Patel
(74) *Attorney, Agent, or Firm* — Polsinelli

(57) ABSTRACT

The present technology provides a system and method for implementing targeted collection of in-situ Operation, Administration and Maintenance data from select nodes in a Segment Routing Domain. The selection is programmable and is implemented by setting an iOAM bit in the function arguments field of a Segment Identifier. In this way only the nodes associated with local Segment Identifiers (Function field of a Segment Identifier) with an iOAM argument bit are directed to generate iOAM data. The iOAM data generated by target nodes may be stored in TLV field of the segment routing header. The Segment Routing packet is then decapsulated at a Segment Routing egress node and the Header information with the collected iOAM data is sent to a controller entity for further processing, analysis and/or monitoring.

15 Claims, 8 Drawing Sheets

(51) Int. Cl.
*H04L 45/02* (2022.01)
*H04L 45/12* (2022.01)
*H04L 69/22* (2022.01)

(52) U.S. Cl.
CPC ........... *H04L 45/306* (2013.01); *H04L 69/22* (2013.01); *H04L 2212/00* (2013.01)

(56) References Cited

U.S. PATENT DOCUMENTS

| | | | |
|---|---|---|---|
| 5,751,223 A | 5/1998 | Turner | |
| 6,812,824 B1 | 11/2004 | Goldinger et al. | |
| D552,603 S | 10/2007 | Tierney | |
| 7,573,862 B2 | 8/2009 | Chambers et al. | |
| D637,569 S | 5/2011 | Desai et al. | |
| 7,975,262 B2 | 7/2011 | Cozmei | |
| 8,010,079 B2 | 8/2011 | Mia et al. | |
| 8,102,814 B2 | 1/2012 | Rahman et al. | |
| 8,260,320 B2 | 9/2012 | Herz | |
| 8,284,748 B2 | 10/2012 | Borghei | |
| 8,300,594 B1 | 10/2012 | Bernier et al. | |
| 8,325,626 B2 | 12/2012 | Tóth et al. | |
| 8,396,485 B2 | 3/2013 | Grainger et al. | |
| 8,446,899 B2 | 5/2013 | Lei et al. | |
| 8,457,145 B2 | 6/2013 | Zimmerman et al. | |
| 8,458,184 B2 | 6/2013 | Dorogusker et al. | |
| D691,636 S | 10/2013 | Bunton | |
| 8,549,638 B2 | 10/2013 | Aziz | |
| 8,553,634 B2 | 10/2013 | Chun et al. | |
| 8,644,301 B2 | 2/2014 | Tamhankar et al. | |
| 8,650,279 B2 | 2/2014 | Mehta et al. | |
| 8,669,902 B2 | 3/2014 | Pandey et al. | |
| 8,676,182 B2 | 3/2014 | Bell et al. | |
| 8,682,279 B2 | 3/2014 | Rudolf et al. | |
| 8,693,367 B2 | 4/2014 | Chowdhury et al. | |
| 8,718,644 B2 | 5/2014 | Thomas et al. | |
| 8,761,174 B2 | 6/2014 | Jing et al. | |
| 8,768,389 B2 | 7/2014 | Nenner et al. | |
| 8,849,283 B2 | 9/2014 | Rudolf et al. | |
| 8,909,698 B2 | 12/2014 | Parmar et al. | |
| 8,958,318 B1 | 2/2015 | Hastwell et al. | |
| 9,060,352 B2 | 6/2015 | Chan et al. | |
| 9,130,859 B1 | 9/2015 | Knappe | |
| 9,173,084 B1 | 10/2015 | Foskett | |
| 9,173,158 B2 | 10/2015 | Varma | |
| D744,464 S | 12/2015 | Snyder et al. | |
| 9,270,709 B2 | 2/2016 | Shatzkamer et al. | |
| 9,271,216 B2 | 2/2016 | Friman et al. | |
| 9,281,955 B2 | 3/2016 | Moreno et al. | |
| D757,424 S | 5/2016 | Phillips et al. | |
| D759,639 S | 6/2016 | Moon et al. | |
| 9,369,387 B2 | 6/2016 | Filsfils et al. | |
| 9,389,992 B2 | 7/2016 | Gataullin et al. | |
| 9,426,305 B2 | 8/2016 | De Foy et al. | |
| D767,548 S | 9/2016 | Snyder et al. | |
| 9,467,918 B1 | 10/2016 | Kwan | |
| D776,634 S | 1/2017 | Lee et al. | |
| 9,544,337 B2 | 1/2017 | Eswara et al. | |
| 9,569,771 B2 | 2/2017 | Lesavich et al. | |
| 9,609,504 B2 | 3/2017 | Karlqvist et al. | |
| 9,615,268 B2 | 4/2017 | Navarro et al. | |
| 9,634,952 B2 | 4/2017 | Gopinathan et al. | |
| 9,642,167 B1 | 5/2017 | Snyder et al. | |
| 9,654,344 B2 | 5/2017 | Chan et al. | |
| 9,712,444 B1 | 7/2017 | Bolshinsky et al. | |
| 9,713,114 B2 | 7/2017 | Yu | |
| 9,736,056 B2 | 8/2017 | Vasseur et al. | |
| 9,762,683 B2 | 9/2017 | Karampurwala et al. | |
| 9,772,927 B2 | 9/2017 | Gounares et al. | |
| 9,820,105 B2 | 11/2017 | Snyder et al. | |
| D804,450 S | 12/2017 | Speil et al. | |
| 9,858,559 B2 | 1/2018 | Raleigh et al. | |
| 9,860,151 B2 | 1/2018 | Ganichev et al. | |
| 9,933,224 B2 | 2/2018 | Dumitriu et al. | |
| 9,923,780 B2 | 3/2018 | Rao et al. | |
| 9,961,560 B2 | 5/2018 | Farkas et al. | |
| 9,967,191 B2 * | 5/2018 | Frost | H04L 47/125 |
| 9,967,906 B2 | 5/2018 | Verkaik et al. | |
| 9,980,220 B2 | 5/2018 | Snyder et al. | |
| 9,985,837 B2 | 5/2018 | Rao et al. | |
| 9,998,368 B2 | 6/2018 | Chen et al. | |
| 2002/0026525 A1* | 2/2002 | Armitage | H04L 12/185 709/238 |
| 2003/0037159 A1* | 2/2003 | Zhao | H04L 47/10 709/232 |
| 2003/0087645 A1 | 5/2003 | Kim et al. | |
| 2003/0116634 A1 | 6/2003 | Tanaka | |
| 2004/0203572 A1 | 10/2004 | Aerrabotu et al. | |
| 2005/0090225 A1 | 4/2005 | Muehleisen et al. | |
| 2005/0147050 A1* | 7/2005 | Klink | H04L 43/50 370/244 |
| 2005/0169193 A1 | 8/2005 | Black et al. | |
| 2005/0186904 A1 | 8/2005 | Kowalski et al. | |
| 2006/0022815 A1 | 2/2006 | Fischer et al. | |
| 2006/0030290 A1 | 2/2006 | Rudolf et al. | |
| 2006/0092964 A1 | 5/2006 | Park et al. | |
| 2006/0126882 A1 | 6/2006 | Deng et al. | |
| 2006/0187866 A1 | 8/2006 | Werb et al. | |
| 2007/0037605 A1 | 2/2007 | Logan | |
| 2007/0239854 A1 | 10/2007 | Janakiraman et al. | |
| 2008/0037715 A1 | 2/2008 | Prozeniuk et al. | |
| 2008/0084888 A1 | 4/2008 | Yadav et al. | |
| 2008/0101381 A1 | 5/2008 | Sun et al. | |
| 2008/0138084 A1* | 6/2008 | Youn | H04J 3/14 398/158 |
| 2008/0163207 A1 | 7/2008 | Reumann et al. | |
| 2008/0233969 A1 | 9/2008 | Mergen | |
| 2009/0129389 A1 | 5/2009 | Halna DeFretay et al. | |
| 2009/0203370 A1 | 8/2009 | Giles et al. | |
| 2009/0282048 A1 | 11/2009 | Ransom et al. | |
| 2009/0298511 A1 | 12/2009 | Paulson | |
| 2009/0307485 A1 | 12/2009 | Weniger et al. | |
| 2010/0039280 A1 | 2/2010 | Holm et al. | |
| 2010/0097969 A1 | 4/2010 | De Kimpe et al. | |
| 2011/0087799 A1 | 4/2011 | Padhye et al. | |
| 2011/0142053 A1 | 6/2011 | Van Der Merwe et al. | |
| 2011/0182295 A1 | 7/2011 | Singh et al. | |
| 2011/0194553 A1 | 8/2011 | Sahin et al. | |
| 2011/0222412 A1* | 9/2011 | Kompella | H04L 45/00 370/241.1 |
| 2011/0228779 A1 | 9/2011 | Goergen | |
| 2012/0023552 A1 | 1/2012 | Brown et al. | |
| 2012/0051229 A1* | 3/2012 | Feldmann | H04L 43/04 370/242 |
| 2012/0054367 A1 | 3/2012 | Ramakrishnan et al. | |
| 2012/0088476 A1 | 4/2012 | Greenfield | |
| 2012/0115512 A1 | 5/2012 | Grainger et al. | |
| 2012/0157126 A1 | 6/2012 | Rekimoto | |
| 2012/0167207 A1 | 6/2012 | Beckley et al. | |
| 2012/0182147 A1 | 7/2012 | Forster | |
| 2012/0311127 A1 | 12/2012 | Kandula et al. | |
| 2012/0324035 A1 | 12/2012 | Cantu et al. | |
| 2013/0010600 A1* | 1/2013 | Jocha | H04L 43/026 370/236.2 |
| 2013/0029685 A1 | 1/2013 | Moshfeghi | |
| 2013/0039391 A1 | 2/2013 | Skarp | |
| 2013/0057435 A1 | 3/2013 | Kim | |
| 2013/0077612 A1 | 3/2013 | Khorami | |
| 2013/0088983 A1 | 4/2013 | Pragada et al. | |
| 2013/0107853 A1 | 5/2013 | Pettus et al. | |
| 2013/0108263 A1 | 5/2013 | Srinivas et al. | |
| 2013/0115916 A1 | 5/2013 | Herz | |
| 2013/0128749 A1* | 5/2013 | Krzanowski | H04L 41/0213 370/241.1 |
| 2013/0145008 A1 | 6/2013 | Kannan et al. | |
| 2013/0155906 A1 | 6/2013 | Nachum et al. | |
| 2013/0191567 A1 | 7/2013 | Rofougaran et al. | |
| 2013/0203445 A1 | 8/2013 | Grainger et al. | |
| 2013/0217332 A1 | 8/2013 | Altman et al. | |
| 2013/0232433 A1 | 9/2013 | Krajec et al. | |
| 2013/0273938 A1 | 10/2013 | Ng et al. | |
| 2013/0317944 A1 | 11/2013 | Huang et al. | |
| 2013/0322438 A1 | 12/2013 | Gospodarek et al. | |
| 2013/0343198 A1 | 12/2013 | Chhabra et al. | |

(56) References Cited

U.S. PATENT DOCUMENTS

| | | |
|---|---|---|
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0031031 A1 | 1/2014 | Gauvreau et al. |
| 2014/0052508 A1 | 2/2014 | Pandey et al. |
| 2014/0059655 A1 | 2/2014 | Beckley et al. |
| 2014/0086253 A1* | 3/2014 | Yong .................. H04L 12/4633 370/395.53 |
| 2014/0087693 A1 | 3/2014 | Walby et al. |
| 2014/0101445 A1* | 4/2014 | Giladi .................. H04L 9/0637 713/168 |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0177638 A1* | 6/2014 | Bragg .................. H04L 45/50 370/395.5 |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1 | 8/2014 | Mermoud et al. |
| 2014/0233460 A1 | 8/2014 | Pettus et al. |
| 2014/0269321 A1 | 9/2014 | Kamble et al. |
| 2014/0280834 A1* | 9/2014 | Medved ................ H04L 47/122 709/223 |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016245 A1* | 1/2015 | Ra ........................ H04L 45/28 370/228 |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326469 A1* | 11/2015 | Kern .................. H04L 12/4641 370/254 |
| 2015/0326704 A1 | 11/2015 | Ko et al. |
| 2015/0358777 A1 | 12/2015 | Gupta |
| 2015/0362581 A1 | 12/2015 | Friedman et al. |
| 2015/0365288 A1* | 12/2015 | Van Der Merwe .......................... H04L 41/5051 370/254 |
| 2016/0007315 A1 | 1/2016 | Lundgreen et al. |
| 2016/0021597 A1* | 1/2016 | Hart ..................... H04W 40/06 370/329 |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0254991 A1* | 9/2016 | Eckert ................ H04L 12/4633 370/225 |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0078896 A1* | 3/2017 | Kephart, Jr ......... H04L 41/0823 |
| 2017/0104660 A1* | 4/2017 | Wexler ................. H04L 43/10 |
| 2017/0111209 A1* | 4/2017 | Ward .................. H04L 41/0631 |
| 2017/0180999 A1 | 6/2017 | Alderfer et al. |
| 2017/0181136 A1 | 6/2017 | Bharadwaj et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0250907 A1* | 8/2017 | Pignataro ................. H04L 45/74 |
| 2017/0273083 A1 | 9/2017 | Chen et al. |
| 2017/0317997 A1 | 11/2017 | Smith et al. |
| 2017/0324622 A1* | 11/2017 | Ubaldi .................... H04L 43/04 |
| 2017/0324651 A1* | 11/2017 | Penno .................... H04L 45/26 |
| 2017/0332421 A1 | 11/2017 | Sternberg et al. |
| 2017/0339706 A1 | 11/2017 | Andreoli-Fang et al. |
| 2017/0366456 A1* | 12/2017 | Dara ....................... H04L 45/20 |
| 2018/0013669 A1* | 1/2018 | Bardhan ................ H04L 45/64 |
| 2018/0062991 A1* | 3/2018 | Nainar ................... H04L 43/08 |
| 2018/0063018 A1 | 3/2018 | Bosch et al. |
| 2018/0069311 A1 | 3/2018 | Pallas et al. |
| 2018/0084389 A1 | 3/2018 | Snyder et al. |
| 2018/0176134 A1* | 6/2018 | Pignataro ................ H04L 47/12 |
| 2018/0278510 A1* | 9/2018 | Iqbal ........................ H04L 45/02 |
| 2018/0278548 A1* | 9/2018 | Pignataro ............ H04L 49/3009 |

FOREIGN PATENT DOCUMENTS

| | | |
|---|---|---|
| WO | WO 2015/131920 | 9/2015 |
| WO | WO 2017/078657 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

"Cisco 10000 Series Router Quality of Service Configuration Guide, Chapter 20: Configuring Quality of Service for MPLS Traffic," Cisco Systems, Inc., Updated Nov. 17, 2013, pp. 1-34.
"Enterprise Mobility 7.3 Design Guide, Chapter 11: CISCO Mobility Services Engine," Cisco Systems, Inc., Updated Apr. 20, 2015, 8 pages.
"I Love WiFi, The difference between L2 and L3 Roaming Events," Apr. 1, 2010, 6 pages.
"Quality of Service Regulation Manual," ITU 2017, pp. 1-174.
"Wi-FI Location-Based Services 4.1 Design Guide," May 20, 2008, 206 pages.
Afolabi, Ibrahim, et al., "Network Slicing & Softwarization: A Survey on Principles, Enabling Technologies & Solutions," Mar. 21, 2018, pp. 1-24.
Ali, Z., et al., "Performance Measurement in Segment Routing Networks with IPv6 Data Plane (SRv6)," Spring Working Group, Feb. 26, 2018, pp. 1-17.
An, Xueli, et al., "Virtualization of Cellular Network EPC Gateways based on a Scalable SDN Architecture," IEEE, Feb. 12, 2015, pp. 1-7.
Antonioli, Roberto, et al., "Dual Connectivity for LTE-NR Cellular Networks," Research Gate, Sep. 3-6, 2017, pp. 171-175.
Bekan, Adnan, et al., "D5.1: Machine Learning Algorithms Development and Implementation," 2016-2018 eWINE Consortium, 23, 2016, pp. 1-72.
Bogale, Tadilo Endeshaw, et al., "Machine Intelligence Techniques for Next-Generation Context-Aware Wireless Networks," arxiv.org, Jan. 12, 2018, pp. 1-10.
Carter, Steve Sr., "E911 VoIP Essentials for Enterprise Deployments," XO Communications, LLC, 2012, 9 pages.
Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.
Cheng, W., et al., "Path Segment in MPLS Based Sement Routing Network," Network Working Group, Oct. 2017, pp. 1-10.
Christidis, Konstantinos, et al., "Blockchains and Smart Contracts for the Internet of Things," IEEE Access, Special Section on the of Research in Internet of Things (IoT), vol. 4, May 10, 2016, pp. 1-12.
Cox, Jacob H. Jr., et al., "Advancing Software-Defined Networks: A Survey," IEEE, Oct. 12, 2017, pp. 25487-25526.
Cui, Wenzhi et al., "DiFS: Distributed Flow Scheduling for Data Center Networks," Nanjing University, China, Jul. 28, 2013, 10 pages.

(56) References Cited

OTHER PUBLICATIONS

Doyle, Matthew G., "An IP Address Management Solution for a Server Solution Provider," A Dissertation Submitted to The University of Liverpool, Sep. 28, 2005, 116 pages.
Galvan T., Carlos E., et al., "Wifi bluetooth based combined positioning algorithm," International Meeting of Electrical Engineering Research ENIINVIE2012, Procedia Engineering 35 (2012), pp. 101-108.
Geller, Michael, et al., "5G Security Innovation with Cisco," Whitepaper Cisco Public, Jun. 8, 2018, pp. 1-29.
Gesbert, David, "Advances in Multiuser MIMO Systems (Tutorial Part II) Emerging Topics in Multiuser MIMO Networks," IEEE PIMRC Conference, Sep. 2007, 107 pages.
Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.
Herb, Daniel, et al., "ROAUM: How to Unblock ROAMING IoT Using BLockchain," available at https://uploads-ssl.webflow.com/5987a08baeea4300016b7bd9/5a7a6d6cee5bc400010a08f2_Roaum_Roaming_IoT_Whitepaper.pdf, pp. 1-14.
Hsieh, Cynthia, "Location Awareness in VMware View 4.5 and Above," VMware, 2011, 8 pages.
Husain, Syed, et al., "Mobile Edge Computing with Network Resource Slicing for Internet-of-Things," IEEE 2017, pp. 1-7.
Jero, Samuel, et al., "Identifier Binding Attacks and Defenses in Software-Defined Networks," USENIX, The Advanced Computing Systems Association, Aug. 16-18-2017, 19 pages.
Ji, Philip N., et al., "Demonstration of High-Speed MIMO OFDM Flexible Bandwidth Data Center Network," Optical Society of America, 2012, 2 pages.
Kandula, Srikanth, et al., "Flyways to De-Congest Data Center Networks," Microsoft Research, Oct. 23, 2009, 6 pages.
Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.
Leonhardt, Ulf, "Supporting Location-Awareness in Open Distributed Systems," May 1998, 186 pages.
Morozov, Yury, "Blockchain Telecom: Bubbletone Blockchain," Dec. 29, 2017, pp. 1-33.
Network Heresy, "NVGRE, VXLAN and What Microsoft is Doing Right," Oct. 3, 2011, 5 pages.
Norwegian National Security Authority, "N-03 Security guidance for switches and routers," Sep. 26, 2012, pp. 1-24.
Saraiva de Sousa, Nathan F., et al., "Network Service Orchestration: A Survey," IEEE Communications Surveys & Tutorials, Mar. 23, 2018, pp. 1-30.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.
Shwetha, D., et al., "A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.
Sun, et al., "The future of Wi-Fi," IEEE Communications Magazine, vol. 52, No. 11, Nov. 21, 2014, 166 pages.
Ventre, Pier Luigi, et al., "Performance Evaluation and Tuning of Virtual Infrastructure Managers for (Micro) Virtual Network Functions," ieee.org, Nov. 7-10, 2016, pp. 1-7.
Wright, Joshua, "Detecting Wireless LAN MAC Address Spoofing," Jan. 21, 2003, pp. 1-20.
Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.
International Search Report and Written Opinion for PCT application No. PCT/US2019/052168 dated Dec. 4, 2019, 12 pages.
S. Bhandari, et al.; "Encapsulations for In-situ OAM Data; draft-brockners-inband-oam-transport-05.txt"; Internet-Drafts, IPPM, Internet Engineering Task Force (IETF); Standard Working Draft, Internet Society (ISOC) 4, Geneva, Switzerland; No. 5, Jul. 3, 2017; 30 pages; XP015120710. [retrieved on Jul. 3, 2017].
S. Bhandari, et al.; "Data Fields for In-situ OAM; draft-ietf-ippm-ioam-data-03.txt"; Internet-Drafts, IPPM, Internet Engineering Task Force (IETF); Standard Working Draft, Internet Society (ISOC) 4, Geneva, Switzerland; No. 3, Jun. 2018; 36 pages; XP01512115. [retrieved on Jun. 27, 2018].

\* cited by examiner

SCALABLE AND PROGRAMMABLE MECHANISM FOR TARGETED IN-SITU OAM IMPLEMENTATION IN SEGMENT ROUTING NETWORKS

TECHNICAL FIELD

The present technology pertains to in-situ collection of operational and telemetry information in a data network. More specifically it is directed to a scalable implementation of in-situ Operation, Administration and Maintenance data probing and collection in a Segment Routing domain.

BACKGROUND

The ever increasing complexity and diversity of application traffic having a diverse range of performance requirements has meant that Service Level Agreement (SLA) may now require routine verification of services provided, for example, by providing a proof of transit showing that the traffic indeed follows the suggested application-specific path. Operation, Administration, and Maintenance (OAM) operations can be implemented to obtain telemetry for all user traffic. However, this approach does not provide real-time results and significantly increases the number of messages or traffic propagating in a network, which may already be highly loaded or suffering performance issues.

In-situ Operation, Administration, and Maintenance (iOAM) records operational and telemetry information in the packet while the packet traverses a path between two points in the network. One of the challenges associated with the "In-situ OAM" mechanisms is the difficulty to implement it in hardware without performance penalties. Enabling "In-situ OAM" probes on all transit nodes can potentially affect the timing of the very stream targeted for monitoring and troubleshooting. Furthermore, the nodes need to have an indication somewhere in the packet header that hardware needs to check for each packet in the network, regardless of whether "In-situ OAM" operation is enabled or not, thus causing additional hardware performance penalties.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
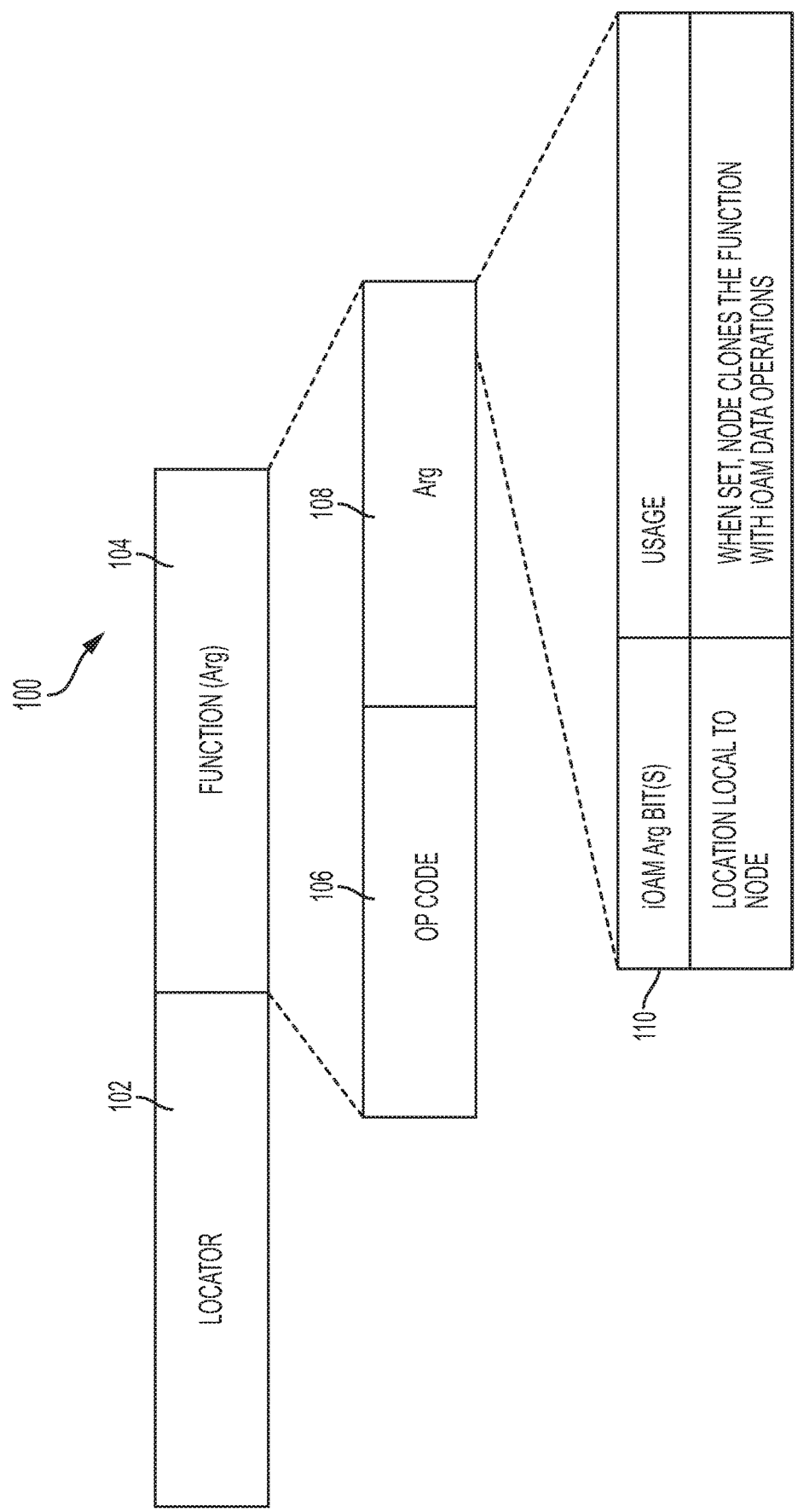
FIG. 1 illustrates a Segment Identifier Format encoding an in-situ OAM probe, in accordance to some embodiments of the present technology.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods and computer-readable storage media are disclosed for scalable and targeted collection of in-situ Operation, Administration, and Maintenance (iOAM) data in a programmable way in a Segment Routing context. In some examples, a method can involve encoding an iOAM instruction as a local argument in the function field of one or more Segment Identifiers (SID) selected from a listing of Segment Identifiers (SID list) specified in the segment routing header of a packet. The one or more SIDs in the SID list of the segment routing header, which feature an iOAM argument bit in their respective function fields, can correspond to one or more Segment Routing nodes selected for iOAM data collection. In some examples, this may be achieved by setting an iOAM bit in the function argument field of one or more Segment Identifier in the Segment Identifier list.

The method can further involve sending the packet to the one or more segment routing nodes based on the segment routing header, receiving a packet containing the iOAM data from the one or more Segment Routing nodes selected for iOAM data collection, and processing the iOAM data from the one or more Segment Routing nodes selected for iOAM data collection. According to some examples, the iOAM data from the one or more targeted Segment Routing nodes can be inserted into one or more Type, Length, Value (TLV) fields of the segment routing header of the packet. An egress Segment Routing node can extract the Segment Routing header, which includes the collected iOAM data from the selected Segment Routing nodes, and send the information to a controller entity for further processing, analysis and/or monitoring. The egress segment routing node may forward the user data packet (e.g., a remaining portion of the Segment Routing encapsulated packet) towards its intended destination. Alternatively the one or more Segment Routing nodes selected for iOAM data collection may insert the generated iOAM data into a duplicate copy of the Segment Routing header. The duplicate copy with the iOAM information included therein is sent to a controller entity using a collector mechanism. The targeted/tapped Segment Routing nodes may then forward the Segment Routing packet with the header-embedded iOAM probes onto the next hop along the Segment Routing Path specified in the SID list.

In some examples, a Segment Routing ingress router that encapsulates the incoming packet with the segment routing header may be used to encode iOAM probe(s) in the function field (or the local SID) of one or more Segment Identifiers selected from the entries in the SID list of the segment routing header. In other examples, selecting target segment routing nodes for iOAM data collection may be performed by a Segment Routing Policy Headend router serving as a controller entity for both selective iOAM probing and iOAM data collection from probed Segment Routing nodes. The encapsulating Segment Routing ingress router and/or the controller entity may programmably change, for example in a round robin fashion, the one or more Segment Routing nodes selected from the SID list of the segment routing header for iOAM probing.

EXAMPLE EMBODIMENTS

Disclosed are systems, methods, and non-transitory computer-readable storage media for scalable programmable in-situ OAM implementation in a Segment Routing context. Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Operations, administration and management (OAM) refer to a set of processes, activities, tools and standards involved with operating, administering, managing and maintaining telecommunication systems and computer networks/hardware. It is often involved with fault management and performance monitoring and may include measurements such as frame loss ratio, frame delay, frame delay variation, continuity checks to assist with Service Level Agreement (SLA) and capacity planning.

OAM functionality generally involves a set of network management tools and functions that provide network fault indication, fault localization, performance information, and data and diagnostic functions. These operations may involve automatic monitoring of environment, detecting and determining faults and alerting administrators, collecting performance statistics, accounting data for the purpose of billing, capacity planning based on usage data and maintaining system reliability. As such, OAM functionality enables effective fault detection, verification, isolation and notification in carrier networks.

In-situ OAM (iOAM) can provide real-time telemetry for individual data packets and flows. iOAM can include operational and telemetry data and metadata embedded within live user traffic (packets that originate and terminate at the application layer). In iOAM, operational information may be recorded in the packet as it traverses a path between two points in the network. As described herein, "In-situ OAM" can be implemented in a IPv6 Segment Routed (SRv6) network by carrying appropriate data fields in the Type Length Value (TLV) fields of a segment routing header (SRH). A bit may be defined in the segment routing header that when set enables in-situ OAM data collection.

The present technology describes methods, systems, for selective probing and collection of iOAM data from programmably selected target nodes in a scalable fashion. The present technology obviates the need to monitor a bit in each incoming packet, as the instruction to perform iOAM function is encoded in the argument field of the SRv6 SID function. This way only nodes for which the local SID has the iOAM argument set will insert the iOAM data. A controller entity (SR policy headend) or a SR encapsulating ingress node may programmably change the iOAM target nodes or iOAM tapping points in order to construct the entire picture or model of how data is traveling in the network, thus providing scalable and programmable in-situ OAM data collection.

Segment Routing (SR) allows a node to steer a packet through a controlled set of instructions, called segments, by prepending a segment routing header (SRH) to the packet. A segment can represent any (forwarding) instruction, topological or service-based. Segment Routing allows for steering of a flow through any path (topological or service/application based) while maintaining per-flow state only at the ingress node of the SR domain. Segments can be derived from different components: IGP, BGP, Services, Contexts, Locators, etc. The list of segment defining an end-to-end forwarding path of the flow packets is called the Segment List and is encoded in the SRH of the packet.

In the IPv6 Segment Routing architecture, a Segment Identifier (SID) may be represented as an IPv6 address modeled as a Locator and a Function. The Locator, as represented by the most significant bits of the address, is used to route the packet to the associated segment (i.e., the node corresponding to the segment). The Function, as represented by the least significant bits of the address, may be used to identify the action to be performed by the segment (i.e., the node corresponding to the segment). Optionally, the function bits may include local arguments, which are encoded in the last bits of the address. The specific address format (i.e., number of bits allocated to each field) is entirely flexible as it may be defined locally by the parent node. SID reachability is made possible by advertising the locator prefix within the routing protocol domain.

Treatment of OAM operation as a SID function, as disclosed by some embodiments of the present technology, enables the implementation of a programmable in-situ OAM. Consequently, instead of only providing a global end-to-end behavior, service providers may control OAM features on a node-by-node basis, enabling specific OAM operations to be performed on selected node(s). The iOAM enabled Segment Identifier includes an iOAM argument bit(s) in the Function field of the Segment Identifier. This may include flipping a bit in the appropriate argument portion of the Segment Identifier's Function field.

FIG. 1 illustrates an example format for a Segment Identifier (SID) 100 carrying an iOAM instruction. The Segment Identifier 100 includes a routable Locator field 102. As stated above, the locator information is encoded by the first most significant bits of the Segment Identifier and represents an address of a particular Segment Routing node (parent node of the local SID) and it is therefore used for routing in a Segment Routing domain. The remaining SID bits constitute the Function field 104 which identifies the function that is executed locally on a particular node, specified by the locator bits. The Function field 104 further comprises a portion 106 for identifying the type of operation to be performed (Op Code) and a portion 108 for storing one or more parameters/arguments that may be required for performing the operation identified by the Op Code (i.e., arguments passed to the function). Presence of iOAM argument bit(s) 110 in the argument portion 108 of the Function field 104 prompt the targeted Segment Routing node to take a specific action such as cloning the Function (104) with iOAM data operations.

Segment Routing deployments can be used to deliver customized services with stringent performance requirements, details of which may be explicitly set forth in a service level agreements (SLA). Ensuring that such service-level guarantees are met may require routine monitoring to verify that a forwarding path across the network is in compliance with the implemented Segment Routing policy and the provisions of the associated Service Level Agreement. To address this requirement, iOAM probing may be implemented to verify a particular Segment Routing policy by monitoring the live data as it is steered across the Segment Routing path. However, implementing this in hardware amount to enabling in-situ OAM probe on all transit nodes which may potentially affect the timing of the actual traffic stream being probed. Therefore some performance penalties may result from the performance measurement operation itself. Additionally, the aforementioned Hardware implemented iOAM probing scheme may further incur additional hardware performance penalties as the examination of header information is performed for all incoming packets, regardless of whether the in-situ OAM is enabled or not.

In the context of Segment Routing based IPv6 (SRv6) networks, iOAM data probing and collection may involve provisioning iOAM data-fields in the Type Length Value (TLV) field of the segment routing header. Moreover iOAM probing operation may involve setting a bit (i.e., O-flag) defined in the segment routing header, which when set indicates that iOAM data collection is enabled. This approach, however, is also susceptible to performance constraints discussed above.

Generally, in-situ OAM (iOAM) data collection is expected to be deployed in a specific domain rather than on the overall Internet. The part of the network which employs iOAM is referred to as the iOAM domain. In-situ OAM data is added to a packet upon entering the iOAM-domain and is removed from the packet when exiting the domain. Within the iOAM-domain, the iOAM data may be updated by network nodes that the packet traverses. The device which adds an iOAM data container to the packet to capture iOAM data is called the iOAM encapsulating node whereas the device which removes the iOAM data container is referred to as the iOAM decapsulating node. Nodes within the domain which are aware of iOAM data and read and/or write or process the iOAM data are called iOAM transit nodes. Restricting the proliferation boundary of iOAM in this way serves to contain the iOAM signaling and data transport traffic along with the resulting processing load within the iOAM domain thus keeping it away from the rest of the network.

The present technology enables selective collection of iOAM data from target nodes in a programmable fashion. Embodiments of the present technology obviate the need to monitor "a" bit (iOAM flag) in each incoming packet, as the instruction to perform iOAM function is encoded in the argument field of the SRv6 SID function. This way only nodes for which the local SID has the iOAM argument set will insert iOAM data. According to some embodiments an SRv6 Policy headend/controller entity may programmably change the iOAM tapping points (devices/nodes selected for iOAM collection) to construct a comprehensive picture of how data is traveling in the network.

Some aspects involve a programmable iOAM implementation that enables a user/operator to specifically select the node from which to collect the desired iOAM data. The iOAM data may be injected into the header of the data packet by the specified node as it forwards the packet onto its next hop. Alternatively a duplicate copy of the packet with the iOAM information inserted therein may be sent to a device, such as a controller entity, using appropriate collector mechanism such as Netflow/IPFIX. An example implementation of programmable iOAM is illustrated in FIG. 2.

Figure 2:
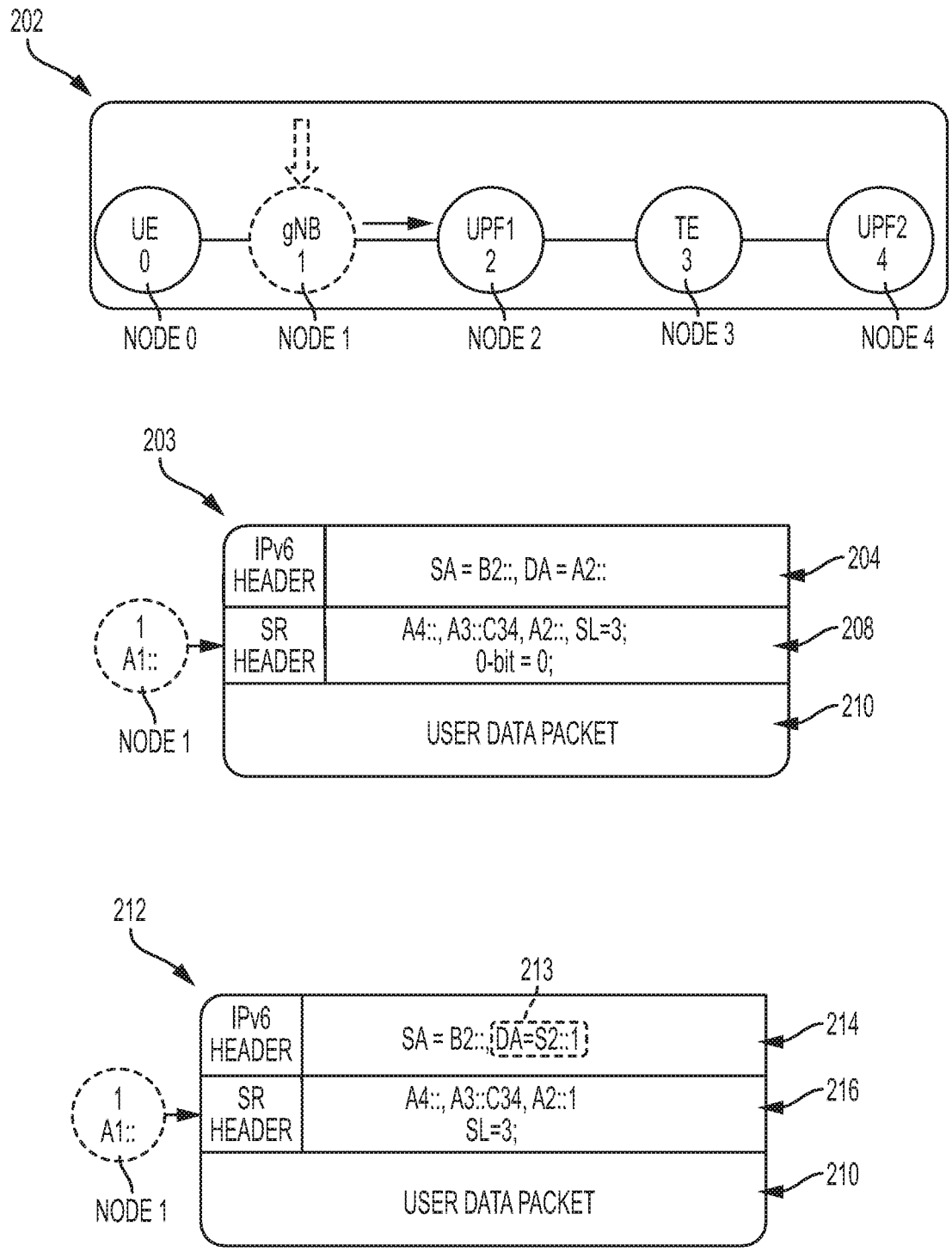
FIG. 2 illustrates two example segment routing headers, one with and the other without an in-situ OAM probe, in accordance to some embodiments of the present technology.

FIG. 2 illustrates an example Segment Routing path/policy 202 where traffic coming from a User Equipment (i.e., smart phone) denoted as Node 0 is steered into a Segment Routing policy at gNodeB (Node 1). The Segment Routing policy steers the traffic via User Plane Function 1 (Node 2) to the Traffic Engineering or service chaining node (Node 3) and finally terminates the flow at User Plane Function 2 (Node 4) which is the end point of the Segment Routing policy 202. The ingress Segment Routing Node (Node 1) encapsulates the incoming flow packet from the User Equipment (Node 0) into a SRv6 packet 203. The SRv6 packet 203 comprises an outer IPv6 header 204 which further contains the segment routing header 208. The original user data packet 210 is left unmodified as the payload. The Source Address (SA) of the packet is the ingress node, the Destination Address (DA) is set as the first segment of the path, which corresponds to Node 2 in the example Segment Routing path 202.

With reference to notations included in the segment routing header in FIG. 2; Node SIDs are represented as an alphabetic letter followed by the node number. For example, Node 2, 3 and 4 correspond to SIDs A2, A3 and A4, respectively. Notation A behind the node number indicate that the node/router is Segment Routing capable. Notation B behind the node number indicate that the node is a classic IPv6 transit node.

The segment routing header (SRH) 208 includes a Segment Identifier (SID) list which corresponds to a list of segments that define the steering path of the packets (i.e., Segment Routing Path 202 in FIG. 1). The Segment List is encoded starting from the last segment of the path (i.e., the first element of the segment list (A4) corresponds to the last segment of the path (Node 4), the second element (A3::C34) contains the penultimate segment of the path (Node 3) and so on). The identifier C34 attached to A3 (Locator SID portion) specifies a function to be performed locally at Node 3. The function or operation denoted by C34 may include switching the packet onto a specific outgoing interface or adjacency link that connects to Node 4 (last segment of the path and the egress node of the Segment Routing policy domain 202). Therefore the SID list representing the Segment Routing path 202 is expressed in the segment routing header 208 as (A2::, A3::C34, A4::).

Segments Left (SL) parameter encoded in the segment routing header 208 represents a pointer of the active segment in the Segment List, and is decremented at each segment. Therefore, the encapsulating node (Node 1) sets the numerical value of the SL parameter, in the Segment Routing header 208, to 2. This identifies Node 2 as the next segment along the Segment Routing path. The O-bit in the segment routing header 208 represents an OAM flag which when set indicates that the present packet is an operations and management (OAM) packet.

According to embodiments of the present technology any nodes across the Segment Routing path may be tapped for iOAM data collection. The Segment Routing (SRv6) packet 212 in FIG. 2 corresponds to a scenario whereby a user/operator wishes to collect iOAM data, on the Segment Routing policy path 202, only at the point of flow transit through the User Plane Function 1 (UPF1) at Node 2. In order to enable iOAM data tapping only at User Plane Function 1 (UPF1) from Node 2 (i.e., to collect iOAM data only from node 2), the ingress Segment Routing Node (Node 1) modifies the Segment Identifier (SID) list in the segment routing header 216 to <A4::, A3::C34, A2(1)::>. The referenced portion 217 in the IPv6 header 218 indicates that SR capable Node $2_{[1]\,[2]}$ has iOAM argument bit enabled. The Segment Routing (SRv6) packet 212 is such that the iOAM argument bit is only enabled on Node 2 as denoted by its modified SID Function notations A2(1). A2(1) is a clone of A2::SID with iOAM data collection bit enabled via a bit in the argument field of the A2::SID function. Such a probe as illustrated by 212 will collect iOAM data only from Node 2.

Figure 3:
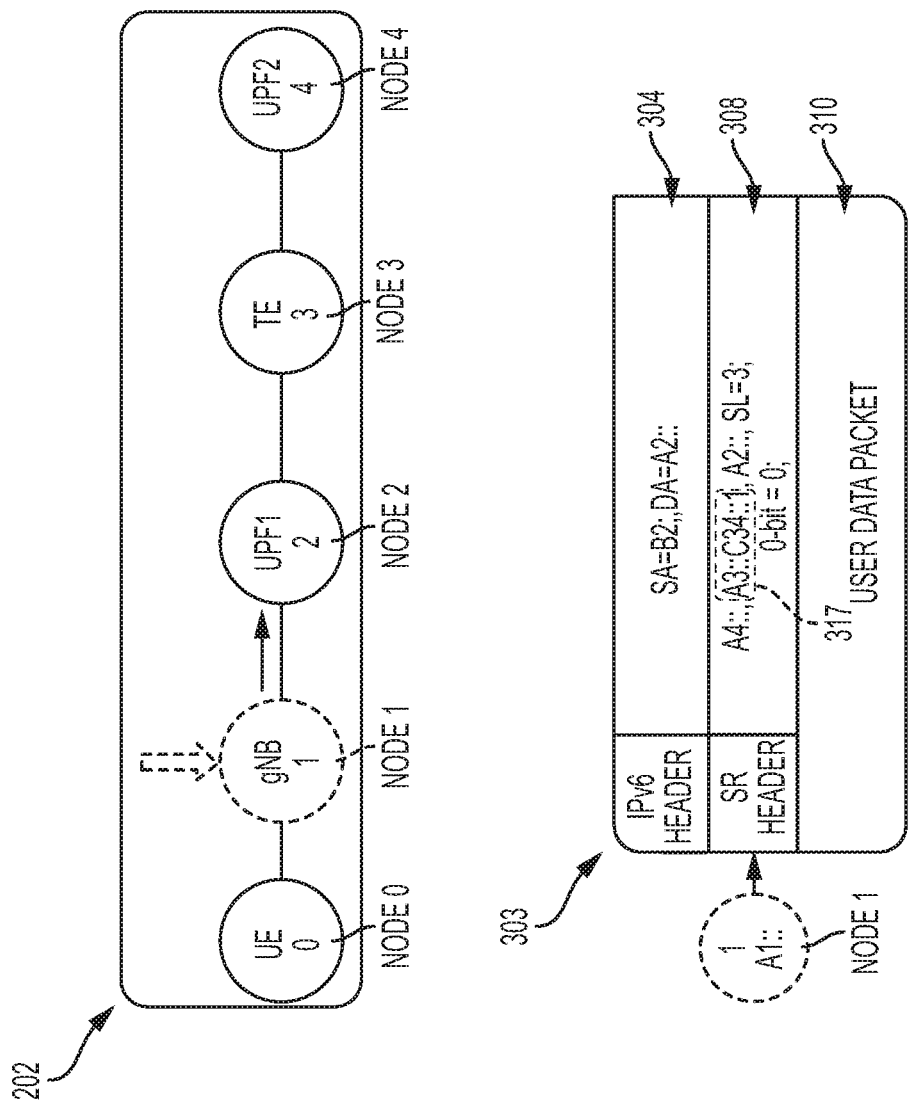
FIG. 3 illustrates a segment routing header with a targeted (node-specific) in-situ OAM probe included therein, in accordance to some embodiments of the present technology.

An example for enabling iOAM data tapping only at the Traffic Engineering or service Node 3 is illustrated in FIG. $3_{[3]}$. The example corresponds to the same Segment Routing Path 202 as FIG. 2. The encapsulated SRv6 packet 303 in FIG. 3 corresponds to a scenario whereby a user/operator wishes to collect iOAM data on the Segment Routing policy path 202 only from the Traffic Engineering or Service Node 3. In order to enable iOAM data tapping only at Node 3 (i.e., to collect iOAM data only from Node 3) the ingress Segment Routing Node (Node 1) modifies the Segment Identifier (SID) list in the segment routing header 308 to (A2::, A3::C34 (1), A4::). The referenced portion 317 of the segment routing header 308 indicates that SR capable Node 3 has iOAM argument bit enabled. The Segment Routing (SRv6) packet 303 is such that the iOAM argument bit is only enabled on Node 3 as denoted by its modified SID Function notations A3::C34(1). The modified/augmented SID of Node 3, A3::C34(1), which includes an iOAM probe in the encoded SID is a clone of the regular SID of Node 3, A3::C34, with the only difference being that in the former case iOAM data collection is enabled via a bit in the argument field of the A3::C34 SID function. Such a probe as illustrated by 303 will collect iOAM data only from Node 3.

According to some embodiment of the present technology, the modified SID with local iOAM probe functionality results from insertion of iOAM probe in the argument field of the locally significant portion (i.e. SID Function field) of a Segment Identifier. In some embodiments, the ingress Segment Routing node may implement iOAM data collection from multiple nodes by performing a round robin targeting of the nodes across the SID list to collect data in a scalable fashion. A controller entity may then run analytics routine and operations on the iOAM partial data to build a holistic view. The procedure is applicable for all underlay and overlay SRv6 SID types.

Due to the programmable nature of iOAM SID, as described by some embodiments, iOAM data collection may also be specified and implemented based on a local decision at a node. Specifically, an iOAM SID may implement iOAM data transport using "forward and punt" technique used by Netflow collector. In this case a copy of the packet is exported from the "tapping" node (iOAM collection node) to a controller entity with the requested iOAM information inserted therein. This case is depicted in FIG. 4.

Figure 4:
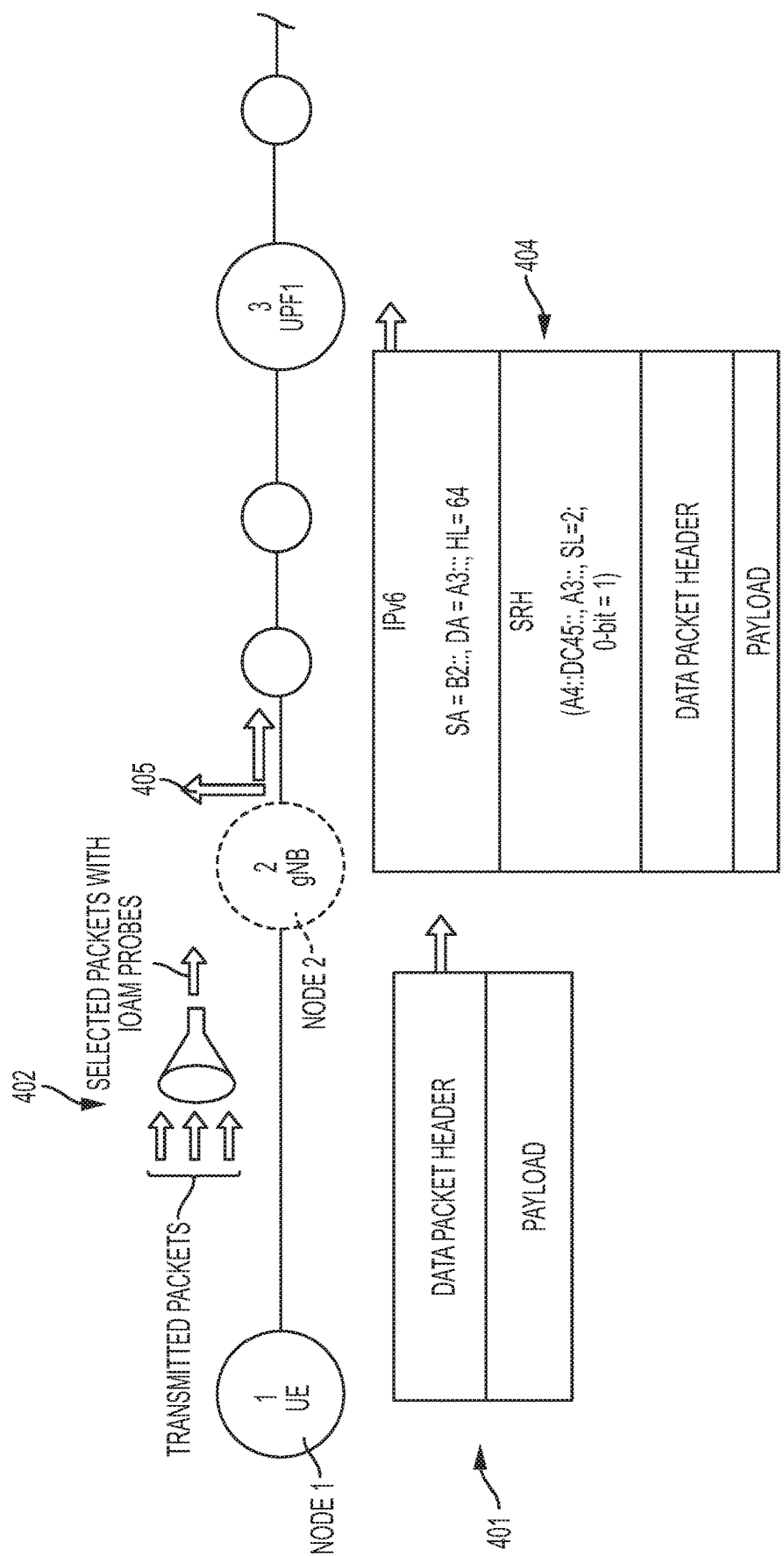
FIG. 4 illustrates targeted iOAM data collection from selected Segment Routing capable nodes, in accordance to some embodiments of the present technology.

With reference to FIG. 4, at 402 some of the User generated packets sourced from User Equipment (Node 1) are marked for insertion of iOAM probe. The iOAM augmentation of the SID of the marked packets is executed at gNodeB (Node 2) where the user data packet 401 is encapsulated with segment routing header 404. The O-bit in the Segment routing Header 404 is set to 1 and the hop limit (HL) is set to 64. As such, Node 2 implements a forward and punt mechanism. At each segment routing node the enabled O-bit (O-bit=1) of the segment routing header causes a time-stamped copy of the packet to be punted (405) and processed elsewhere.

As described above, a segment routing header (SRH) can be used to steer packets through paths with given properties (e.g., bandwidth or latency) and through various network functions (e.g., firewalling). The list of segments present in the segment routing header thus specifies the network policy that applies to the packet. Each segment routing header contains at least a list of segments and a Segments Left pointer that references the current active segment (a value of 0 refers to the last segment). In addition, an segment routing header can optionally include extended information encoded as Type-Length-Value (TLV) fields. Another use of TLV is as a global argument field for passing additional information between locally executed SID Functions. An iOAM augmented SID may implement iOAM data transport inside of the data packet by using the TLV fields of the segment routing header. As such iOAM data records may be transported in the respective Type Length Value (TLV) data fields of the segment routing header until the flow is terminated at a Segment Routing egress router. The egress router will decapsulated the user data and send the segment routing header including the iOAM data inserted into TLV fields to a controller entity. This case is illustrated in FIG. 5.

Figure 5:
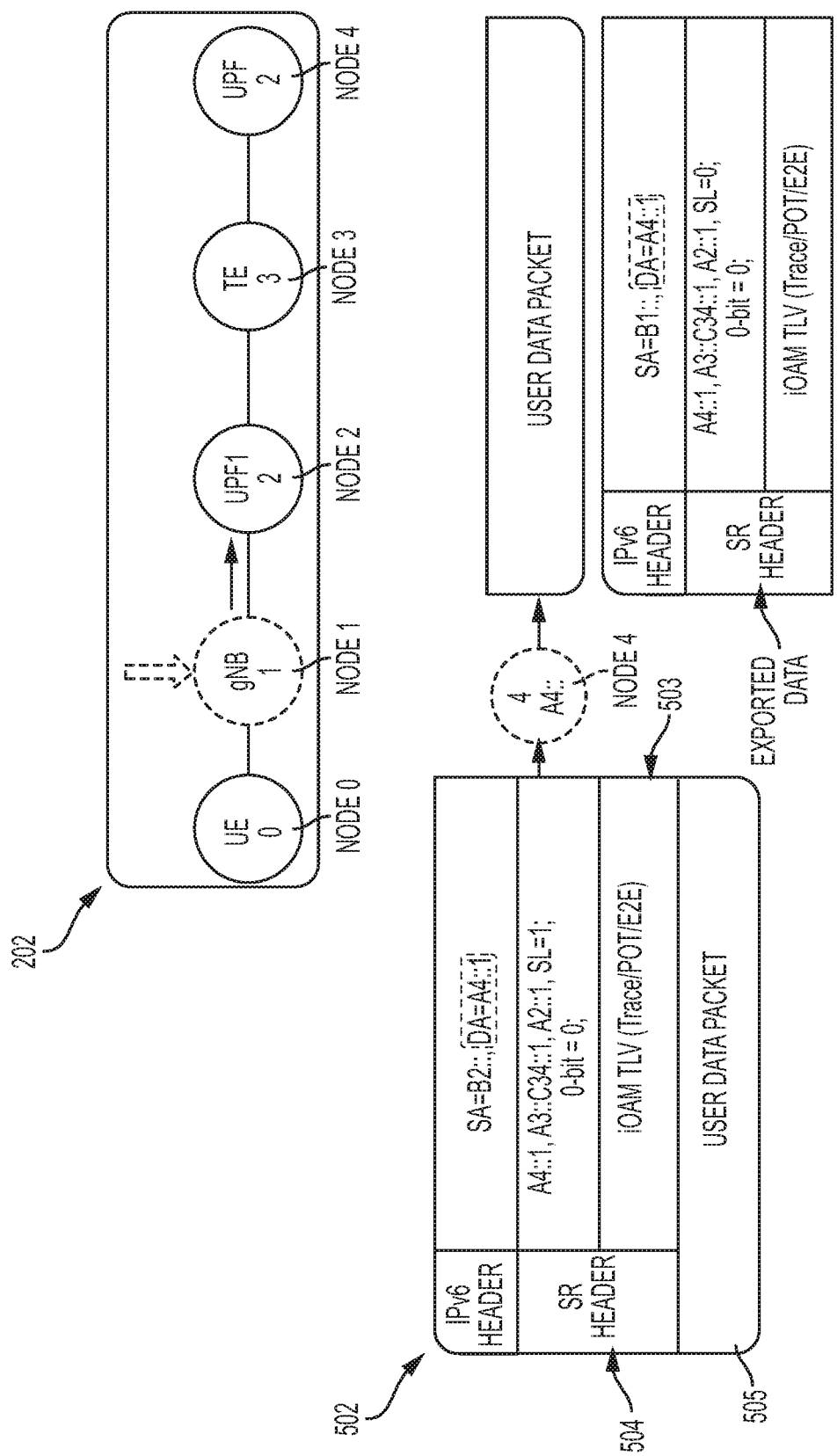
FIG. 5 illustrates a segment routing header transporting in-situ OAM data in its Type, Length, Value (TLV) fields which is decapsulated by the egress Segment Routing node and sent to a controller entity, in accordance to some embodiments of the present technology.

FIG. 5 illustrates a Segment Routing packet 502 with iOAM probes enabled for the selected Segment Routing Nodes. The iOAM data generated at each iOAM tapping point (i.e., Segment Routing nodes with an iOAM argument bit enabled in the function filed of the respective Segment Identifier) is collected in TLV fields 503 of the segment routing header 504. Node 4 is the egress node of the Segment Routing path 202. Therefore, Node 4 will decapsulated the Segment Routing packet 502 and export the segment routing header 504 with the collected iOAM data in the corresponding TLV fields to a controller entity, using, for example a Netflow collector. The User data packet 505 is then transported to the intended destination.

For clarity of explanation, in some instances the present technology may be presented as including individual functional blocks including functional blocks comprising devices, device components, steps or routines in a method embodied in software, or combinations of hardware and software.

Figure 6:
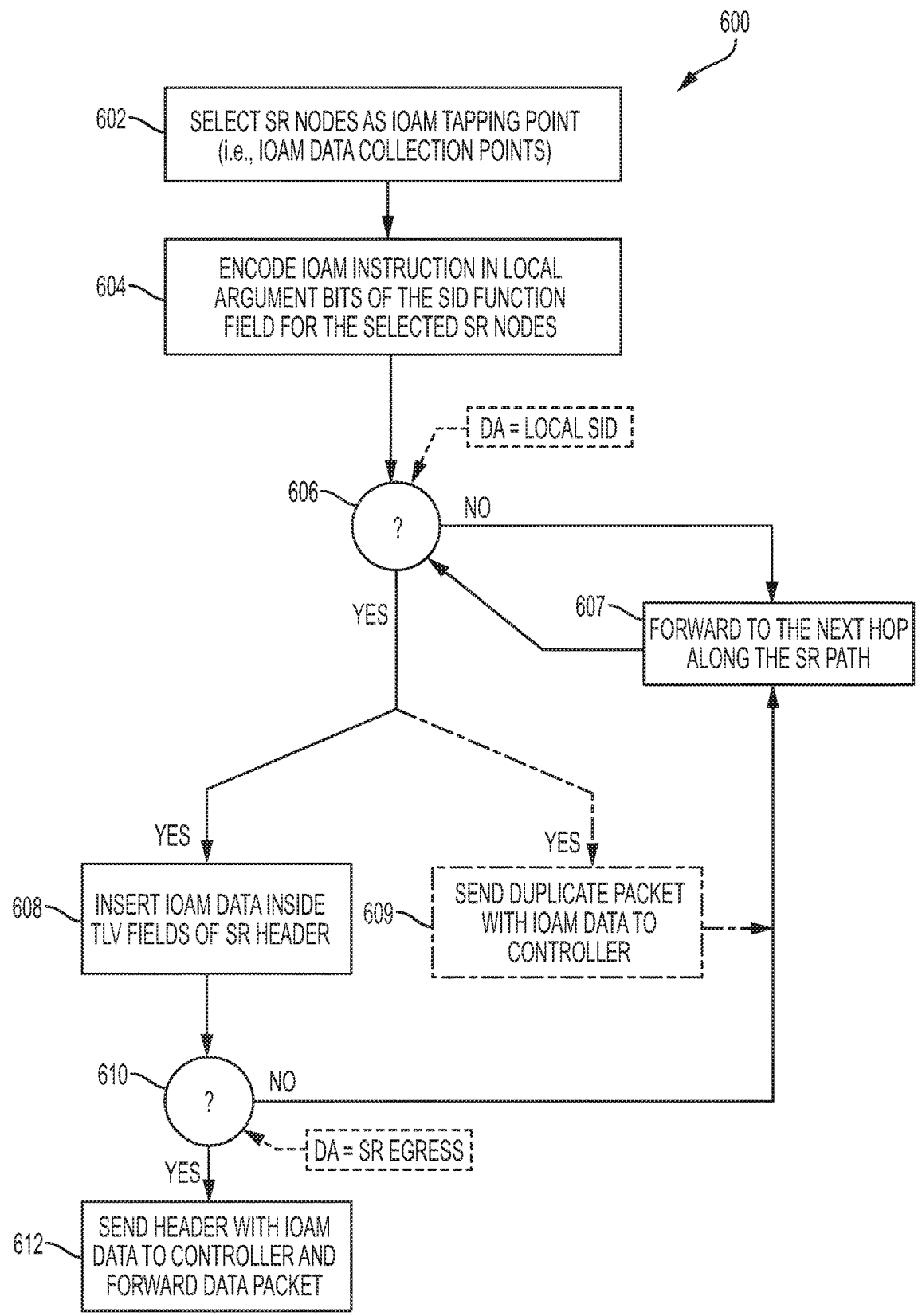
FIG. 6 illustrates a flowchart for an example method of implementing targeted iOAM probing in Segment Routing context, in accordance to some embodiments of the present technology

An example flow chart 100, as presented in FIG. 6. illustrates targeted iOAM probing in Segment Routing context in accordance to some embodiments of the present technology. With reference to FIG. 6, at step 602 one or more Segment Routing (SR) nodes for iOAM data tapping to targeted iOAM data collection are identified. The iOAM instruction is encoded as a local argument in the function field of one or more Segment Identifiers (SIDs) corresponding to the one or more selected SR nodes at step 604.

Each SR capable node maintains a "My Local SID Table". The table contains all the local segments explicitly instantiated at the node. Each entry of the "My Local SID Table" indicates the function associated with the local SID. As the SR packet travels the network, the Locator and Function are copied by each SR node to the destination address field of the SR header. When the SID inside of the SR header matches Local SID table of the SR capable node, the node executes a function encoded in the right part (Function field) of the SID. The next SID is placed into the SR Header destination field and the Segment Left Value is decreased by 1 accordingly.

Referring back to the Flowchart 100 in FIG. 6, at step 606, Destination address field of the SR header is compared with the SID of the SR Node the packet is forwarded to. In accordance to some embodiments of the technology, if there is a match (Locator portion of the destination SID matches the Locator portion of the Node SID and the function field of the destination SID is carrying an iOAM probe as argument), the operation moves to step 608 whereby the iOAM function is executed and the iOAM data is inserted inside TLV fields of the SR Header. If, however, the result of the comparison at step 606 returns no match, the packet is forwarded to the next hop along the SR path and step 606 is repeated until a match is encountered, at which point the operation moves to step 608 as explained above.

At step 610 the operation verifies whether the current SR node is the SR Egress node. If the SR node does not correspond to the SR Egress node, the operation moves back to step 607 and the packet is forwarded to the next hop along the SR path and the process is repeated. However, if the comparison at step 610 reveals that the current SR node is the SR Egress router, the operation moves to 612 whereby the egress router decapsulates the header information and sends the header information along with the iOAM data embedded therein to a controller entity for further analysis and/or monitoring.

According to some embodiments of the present invention, after verifying a match at step 606, a duplicate copy of the packet including the requested iOAM data is generated by the SR node and sent to the controller entity for further analysis and/or monitoring. The operation is then moved to step 607, whereby the original packet is forwarded to the next hop along the SR path.

Figure 7:
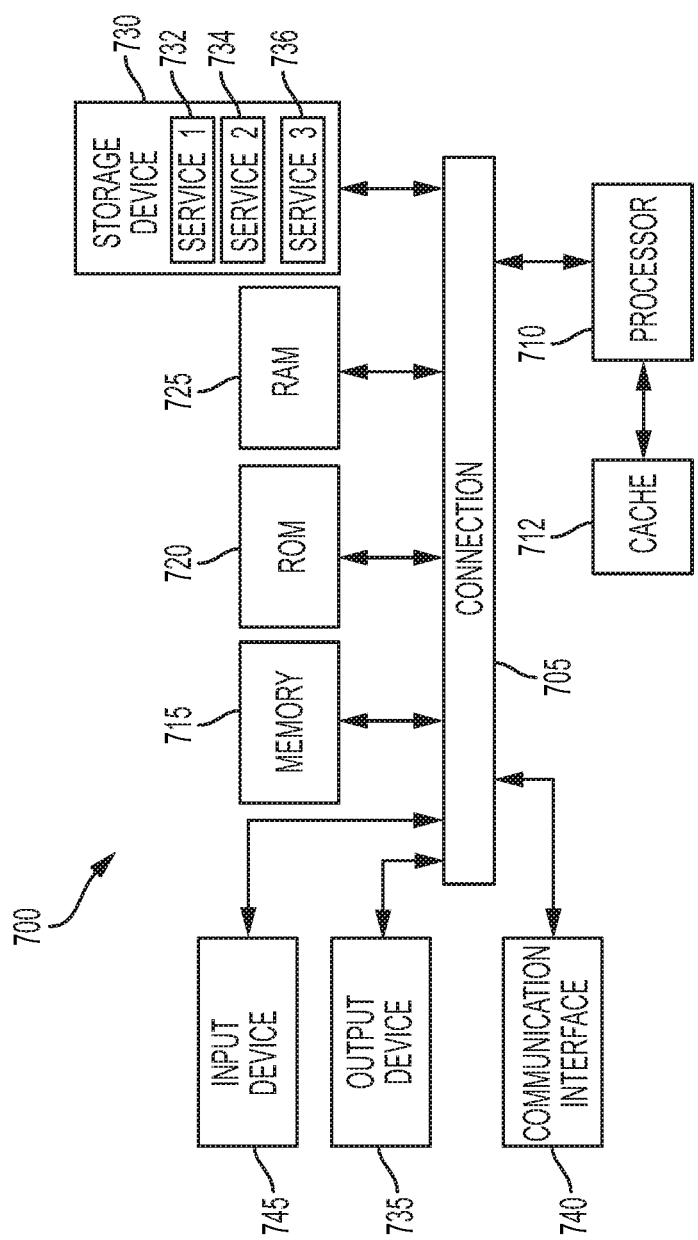
FIG. 7 illustrates an example network device in accordance to some embodiments of the present technology.
Figure 8:
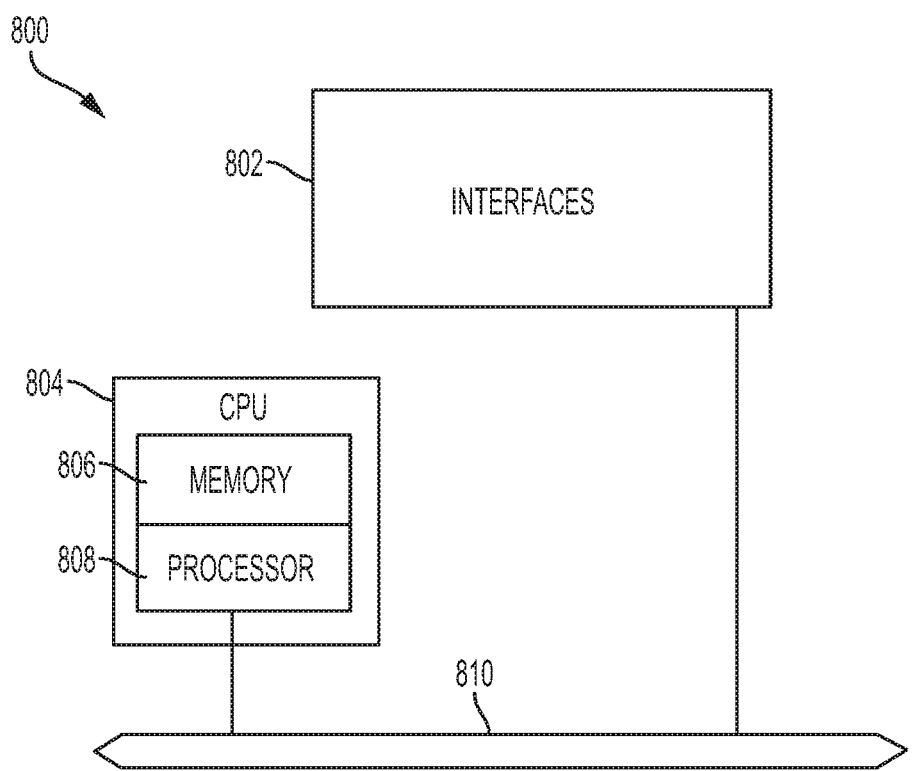
FIG. 8 illustrates an example architecture of a computing device, in accordance to some embodiments of the present technology.

The disclosure now turns to FIGS. 7 and 8, which illustrate example architectures of computing and network devices, such as client computers, switches, routers, controllers, servers, and so forth.

FIG. 7 illustrates a computing system architecture 900 including components in electrical communication with each other using a connection 905, such as a bus. System 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

FIG. 8 illustrates an example network device 1000 suitable for performing switching, routing, assurance, and other networking operations. Network device 1000 includes a central processing unit (CPU) 1004, interfaces 1002, and a connection 1010 (e.g., a PCI bus). When acting under the control of appropriate software or firmware, the CPU 1004 is responsible for executing packet management, error detection, and/or routing functions. The CPU 1004 preferably accomplishes all these functions under the control of software including an operating system and any appropriate applications software. CPU 1004 may include one or more processors 1008, such as a processor from the INTEL X106 family of microprocessors. In some cases, processor 1008 can be specially designed hardware for controlling the operations of network device 1000. In some cases, a memory 1006 (e.g., non-volatile RAM, ROM, TCAM, etc.) also forms part of CPU 1004. However, there are many different ways in which memory could be coupled to the system. In some cases, the network device 1000 can include a memory and/or storage hardware, such as TCAM, separate from CPU 1004. Such memory and/or storage hardware can be coupled with the network device 1000 and its components via, for example, connection 1010.

The interfaces 1002 are typically provided as modular interface cards (sometimes referred to as "line cards"). Generally, they control the sending and receiving of data packets over the network and sometimes support other peripherals used with the network device 1000. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 1004 to efficiently perform routing computations, network diagnostics, security functions, etc.

Although the system shown in FIG. 8 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 1000.

Regardless of the network device's configuration, it may employ one or more memories or memory modules (including memory 1006) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1006 could also hold various software containers and virtualized execution environments and data.

The network device 1000 can also include an application-specific integrated circuit (ASIC), which can be configured to perform routing, switching, and/or other operations. The ASIC can communicate with other components in the network device 1000 via the connection 1010, to exchange data and signals and coordinate various types of operations by the network device 1000, such as routing, switching, and/or data storage operations, for example.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
encoding an in-situ Operation, Administration, and Maintenance (iOAM) instruction as a local argument in a function field defining an end portion of one or more segment identifiers (SIDs) selected from a plurality of SIDs in an SID list of a segment routing header (SRH) in a first packet, wherein the one or more SIDs are Segment Routing over IPv6 (SRv6) SIDs corresponding to one or more segment routing nodes selected for iOAM data collection, the encoding performed on the end portion of the one or more SIDs;
sending the first packet to the one or more segment routing nodes based on the SRH;
receiving a second packet containing the iOAM data from the one or more segment routing nodes selected for the iOAM data collection;
processing the iOAM data from the one or more segment routing nodes selected for the iOAM data collection; and
wherein each of the one or more segment routing nodes selected for the iOAM data collection is configured to send a copy of the SRH containing iOAM data to a controller.

2. The method of claim 1, wherein the iOAM data provided by the one or more segment routing nodes is inserted into one or more Type, Length, Value (TLV) fields of the SRH.

3. The method of claim 2, wherein the iOAM data is decapsulated by a Segment Routing egress node and sent to a controller entity.

4. The method of claim 1, wherein the collector mechanism corresponds to a Netflow or IPFIX collector mechanism.

5. The method of claim 1, further comprising:
varying, using a controller entity, the one or more segment routing nodes selected for the iOAM data collection to optimize the iOAM data collection without increasing iOAM traffic.

6. The method of claim 5, wherein the controller entity is a Segment Routing Policy Headend router.

7. At least one non-transitory computer-readable storage medium comprising instructions stored therein, which when executed by one or more processors, cause the one or more processors to:
  encode an in-situ Operation, Administration, and Maintenance (iOAM) instruction as a local argument in a function field defining an end portion of one or more segment identifiers (SIDs), the one or more SIDs selected from a plurality of SIDs in an SID list of a segment routing header (SRH) in a first packet, wherein the one or more SIDs are Segment Routing over IPv6 (Srv6) SIDs corresponding to one or more segment routing nodes selected for iOAM data collection;
  send the first packet to the one or more segment routing nodes based on the SRH;
  receive a second packet containing the iOAM data from the one or more segment routing nodes selected for the iOAM data collection;
  process the iOAM data provided by the one or more segment routing nodes tapped for the iOAM data collection; and
  wherein each of the one or more segment routing nodes selected for the iOAM data collection is configured to send a copy of the SRH containing iOAM data to a controller using a collector mechanism.

8. The at least one non-transitory computer-readable storage medium of claim 7, wherein the iOAM data provided by the one or more segment routing nodes is inserted into one or more Type, Length, Value (TLV) fields of the SRH.

9. The at least one non-transitory computer-readable storage medium of claim 8, wherein the iOAM data is decapsulated by a Segment Routing egress node and sent to a controller entity.

10. The at least one non-transitory computer-readable storage medium of claim 7, wherein the collector mechanism corresponds to a Netflow or IPFIX collector mechanism.

11. The at least one non-transitory computer-readable storage medium of claim 7, wherein the instructions, when executed by the one or more processors, further cause the one or more processors to vary, using a controller entity, the one or more segment routing nodes selected for the iOAM data collection to optimize the iOAM data collection without increasing iOAM traffic.

12. The at least one non-transitory computer-readable storage medium of claim 11, wherein the controller entity is a Segment Routing Policy Headend router.

13. A system comprising:
  one or more processors; and
  at least one computer-readable storage medium having stored therein instructions which, when executed by the one or more processors, cause the system to:
    encode an in-situ Operation, Administration, and Maintenance (iOAM) instruction in a function field defining an end portion of one or more segment identifiers (SIDs), the one or more SIDs selected from plurality of SIDs in an SID list of a segment routing header (SRH) in a first packet, wherein the one or more SIDs are Segment Routing over IPv6 (SRv6) SIDs corresponding to one or more segment routing nodes selected for iOAM data collection, wherein the SID list represents a segment routing policy path;
    send the first packet to the one or more segment routing nodes based on the SRH;
    receive a second packet containing the iOAM data from the one or more segment routing nodes selected for the iOAM data collection;
    process the iOAM data in the second packet from the one or more segment routing nodes selected for the iOAM data collection; and
    wherein each of the one or more segment routing nodes selected for the iOAM data collection is configured to send a copy of the SRH containing iOAM data to a controller using a collector mechanism.

14. The system of claim 13, wherein the iOAM data provided by the one or more segment routing nodes is inserted into one or more Type, Length, Value (TLV) fields of a second SRH associated with the second packet.

15. The system of claim 13, wherein the at least one computer-readable storage medium stores additional instructions which, when executed by the one or more processors, cause the system to:
  decapsulate the SRH to yield decapsulated iOAM data; and
  send the decapsulated iOAM data to a collector entity.

* * * * *